United States Patent [19]

Kelly

[11] Patent Number: 5,002,036
[45] Date of Patent: Mar. 26, 1991

[54] FIELD BARBECUE APPARATUS

[76] Inventor: Thomas E. Kelly, 219 Plymouth Ave., Oreland, Pa. 19075

[21] Appl. No.: 220,132

[22] Filed: Jul. 18, 1988

[51] Int. Cl.[5] ............................ A47J 37/00; F24B 3/00
[52] U.S. Cl. ................................ 126/25 R; 126/25 A; 126/9 R
[58] Field of Search ................. 126/25 R, 25 A, 9 R; 99/450, 447, 449

[56] References Cited

U.S. PATENT DOCUMENTS

| | | | |
|---|---|---|---|
| 282,235 | 7/1883 | Stern | 126/25 R |
| 3,306,280 | 2/1967 | Vannoy | 126/25 R |
| 3,330,266 | 7/1967 | Stephen | 126/25 R |
| 3,389,696 | 6/1968 | Lake | 126/25 A |
| 4,062,340 | 12/1977 | Huff | 126/25 R |
| 4,471,749 | 9/1984 | Galdes | 126/25 R |
| 4,553,524 | 11/1985 | Wheat et al. | 126/41 R |
| 4,592,335 | 6/1986 | Beller | 126/25 R |

Primary Examiner—James C. Yeung
Attorney, Agent, or Firm—Eugene Chovanes

[57] ABSTRACT

A field barbecue apparatus for preparing large quantities of food. The apparatus includes a rectangular enclosure that maintains a hot air cooking and warming environment around the food. The enclosure in cross section has a height approximately equal to its width.

3 Claims, 2 Drawing Sheets

FIELD BARBECUE APPARATUS

FIELD OF THE INVENTION

An apparatus of the type used for preparing foods, particularly meats, by barbecuing wherein the food is suspended over a burning layer of charcoal.

BACKGROUND OF THE INVENTION

A popular method of preparing meat, such as chicken, beef or pork, outdoors, makes use of charcoal burners in which the food is suspended to achieve the desirable cooked state. Numerous barbecue grill devices are prevalent, particularly of the "backyard" variety. Such devices include fireboxes, grills, and covers such as domes, as well as suitable air vents both beneath the charcoal fire as well as in the cover.

Much personal skill and judgment is used in utilizing these barbecue devices and it is common knowledge that some individuals are more skillful at preparing tasty and properly cooked food than others. Even with skilled cooks, however, the results are often varied.

There is a present growing trend, emanating primarily from the southwest portion of the United States, toward a large, mass-type public barbecue wherein large numbers of people, for instance, 100 or more, attend and are fed at such large-scale events. Food prepared by the barbecue method for such large events generally involves burning briquette-size charcoal contained in pits dug in the earth or, alternately, in large metal drum-like structures such as 50-gallon metal drums split longitudinally. Grillwork, for instance in the form of wire screening, is laid over the fire. The food is either placed directly on this grillwork or, where for instance a large animal such as a hog is prepared, a revolving shaft in the form of a spit is created.

Whereas in "backyard" cooking, the variable results referred to above are generally acceptable, it is highly desirable in barbecue events for large crowds to have a relatively uniform consistency in the end results. This has been hard to achieve with the prior art equipment, either individually fabricated or available from manufacturers.

Examples of equipment available from manufacturers include flat trays on legs for receiving the briquettes and grills of, for instance, rod steel suspended over the trays. Additional accessories include rotisseries in the form of a power driven, rotating shaft suspended above the firebox tray as well as flat metal covers which can be parked over the tray to control the escape of heat and cooking speed.

Such factory-manufactured apparatus corresponds in function and appearance rather closely to the home-made structures discussed above.

A more refined manufactured arrangement for large scale barbecue involves mobile, wood burning barbecue pits which restaurants, catering firms, and for instance theme parks use. These are in effect large stoves on wheels that involve stainless steel exteriors, refined thermostatic control mechanisms involving temperature-indicating signals and electronic controls. They generally burn wood logs.

Of course, all the above mentioned prior art seeks to utilize the actual or perceived benefits from cooking with heat created by burning wood in charcoal form, or otherwise. Such benefits include, when optimum conditions are attained, a moist, juicy, tasty, flavorful product wherein the flavor is derived from the wood.

Such desirable attributes of charcoal prepared food when done in an optimum manner are well known to the public.

In the prior art, in mass prepared barbecue cooking, as explained above, the benefits sought were often lost, and the cooked food was dry, burnt, non-uniformly cooked, cold, or otherwise unappetitizing. One or more of the numerous factors governing the barbecue were not suitably controlled; for instance, too fast cooking time, too high or too low heat, non-uniform heat, or an improper environment between the finish of the actual barbecuing and the serving of the food.

SUMMARY OF THE PRESENT INVENTION

The apparatus of the present invention prepares large quantities of food such as 24 or more 3-lb. whole dressed chickens, or a 70-lb. dressed hog, in a high initial temperature heat environment of, for instance, 450° F., by creating a controlled air environment in which the food is suspended around a burning layer of charcoal briquettes. The controlled air environment is created by enveloping the charcoal and food in a metal, rectangular, boxlike structure of a firebox enclosure having a suitable ventilating series of holes at the bottom and top thereof. The boxlike structure is more specifically of a rectangular shape in cross section wherein the vertical dimension of the structure is approximately that of the width. It has been found that such a height in a rectangular structure will optimally contain a body of hot gases which quickly cooks the food, imparts taste, retains moisture in the food, cooks the food uniformly, keeps the food in such optimum condition after cooking as to preserve such optimum results, conserves the briquette charcoal cooking fuel, eliminates grease fires from dripping fat in the briquette layer, and substantially reduces risk from personal injury from exposed hot briquettes receiving dripping grease which flames or sputters, creating risk to bystanders.

Suitable vent holes are placed in the top of the rectangular enclosure as well as in the bottom of the firebox to provide both primary air from below the tray and secondary air from the upper vent holes. Additionally, the upper vent holes provide a restricted venting of the hot gases of combustion to avoid a build up of undesirable products of combustion within the chamber. The upper holes can be plugged to control secondary air supply as well as vent flow.

DETAILED DESCRIPTION OF THE INVENTION

Figure 1:
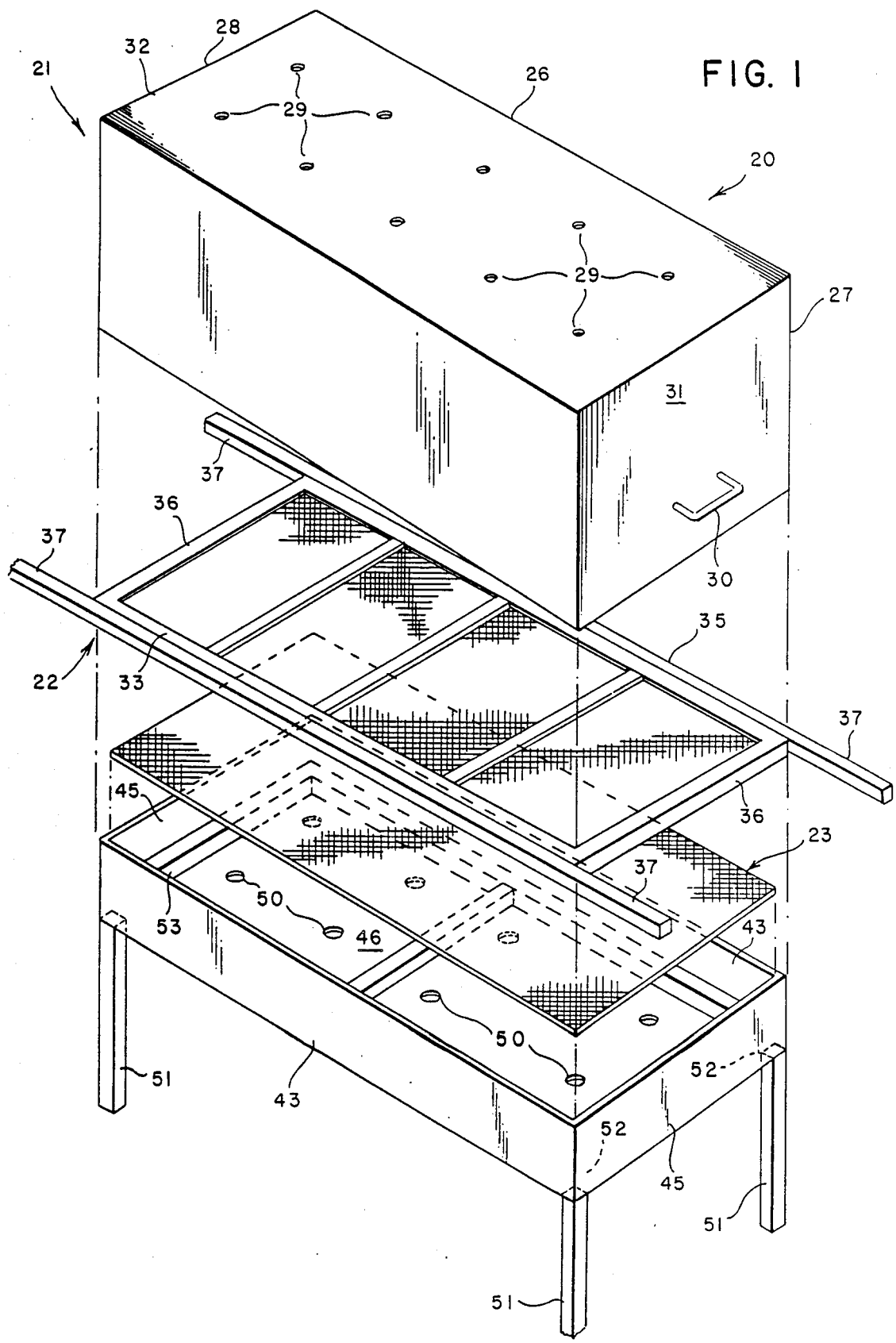
FIG. 1 is an exploded view of the apparatus of the invention.

Referring to FIG. 1, there is shown therein apparatus 20 comprising enclosure 21, grill 22, fire bed 23, and firebox 25.

The enclosure, for instance, has a length 26 of 54", a height 27 of 24", and a width 28 of 28".

The enclosure is of a rectangular shape and suitably constructed as by welding of, for instance, black carbon sheet steel, ⅛" thickness. The enclosure has holes 29 at the top thereof of approximately 1" in diameter. They are suitably ten in number, centrally located and arranged in two rows.

Handles 30 of bent rod are welded at opposing ends 31 and 32 of the enclosure.

The grill 22 is constructed of a grid of wire rod 33 of, for instance, ⅜" diameter, the rod being of a common black steel or wrought iron. The grid opening is of ½" dimension. The rods are suitably spot welded at the cross points and are framed in 1" angle irons 35 extending lengthwise, and similar angle irons 36 extending crosswise.

The lengthwise angle irons 35 extend beyond grill rods 33 at both ends of the grill, to provide handles 37, in the fashion of litter handles. The area of rod 33 and the shape of such areas conforms to the area of the enclosure in a horizontal plane, as seen in FIG. 1.

Fire bed 23 is formed of rods 40 of a ¼" diameter arranged in rectangular grids of ½" dimension. The rods are suitably spot welded at their crossing points. The fire bed 23 has an area conforming to the inside horizontal area of firebox 25, as seen in FIG. 1. Firebox 25 is formed of a rectangular shape having opposing long sides 43 and opposing short sides 45 joined to a botton 46.

The firebox 25 is rectangular in shape and is formed of black sheet iron of the type used in enclosure 21. The horizontal dimensions of the firebox 25 as to its length and width conform to the corresponding dimensions of enclosure 21. The bottom 46 has a plurality of holes 50 for instance about 1" in diameter extending in grid fashion in spaced relationship over the bottom of the box.

Suitable pipe legs 51, for instance 25" in length and 2" in diameter, of common black steel are threaded into fittings 52 welded on the bottom of firebox 25.

Firebox 25 is, for instance, 6" in height and has suitably fixed therein a shelf 53 extending completely around the interior of the box at a distance of, for instance, 1¾" from the bottom 46. The firebox 25 distance above shelf 53 to the top is approximately 4¼". Shelf 53 can be formed by, for instance, welding or riveting an angle around the interior of the firebox 25.

Figure 2:
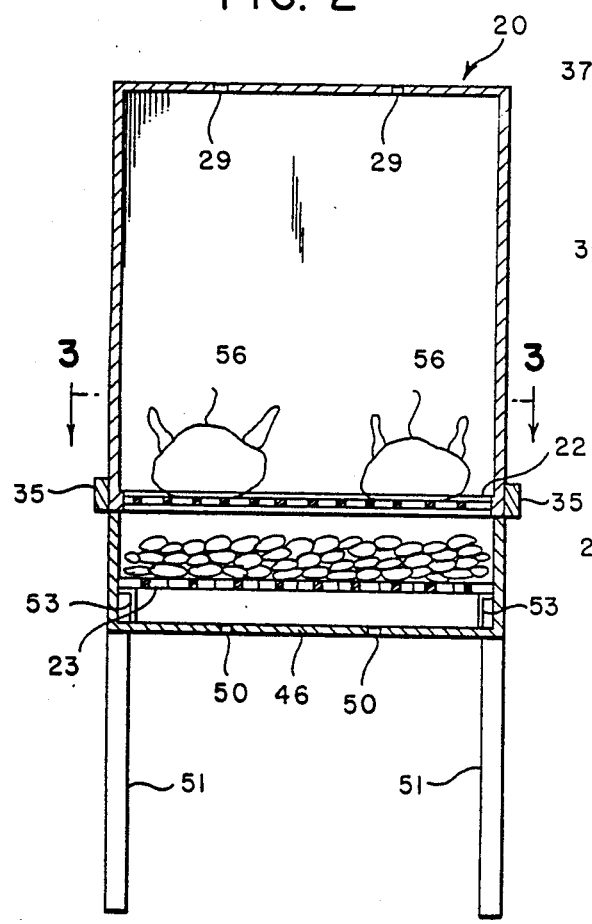
FIG. 2 is a sectional elevational view through the device in assembled form and in operation, showing barbecuing of multiple food items of relatively uniform size, such as a plurality of chickens.

In assembled condition, the fire bed 23 is placed on shelf 53 within firebox 25 as seen, for instance, in FIG. 2. Two bags, or about forty pounds of charcoal briquettes 55 of a standard common size, for instance 1½" in maximum dimension, are laid about the fire bed 23. The briquettes are desirably heaped in a mound running longitudinally along the fire bed 23 with the edges of the mound spaced about four inches away from the long sides of the firebox. In operation, the charcoals are then ignited by uniformly pouring starter fluid, for instance two quarts, over the entire mound of coals. The coals are then ignited.

The coals are allowed to heat for about fifteen minutes in a mound formation. The coals are then spread evenly over the firebox with a shovel, or other device.

The grill 22 is next placed over firebox 25 with the sides 35 and ends 36, in the form of angles, placed outside the box, being of a dimension that permits such placement. This provides a restraint against horizontal movement of the grill 22 with respect to the firebox 25. The lengthwise extensions 37 of angled sides 35 rest on the firebox walls to support the grill 22 vertically with respect to the box.

Figure 3:
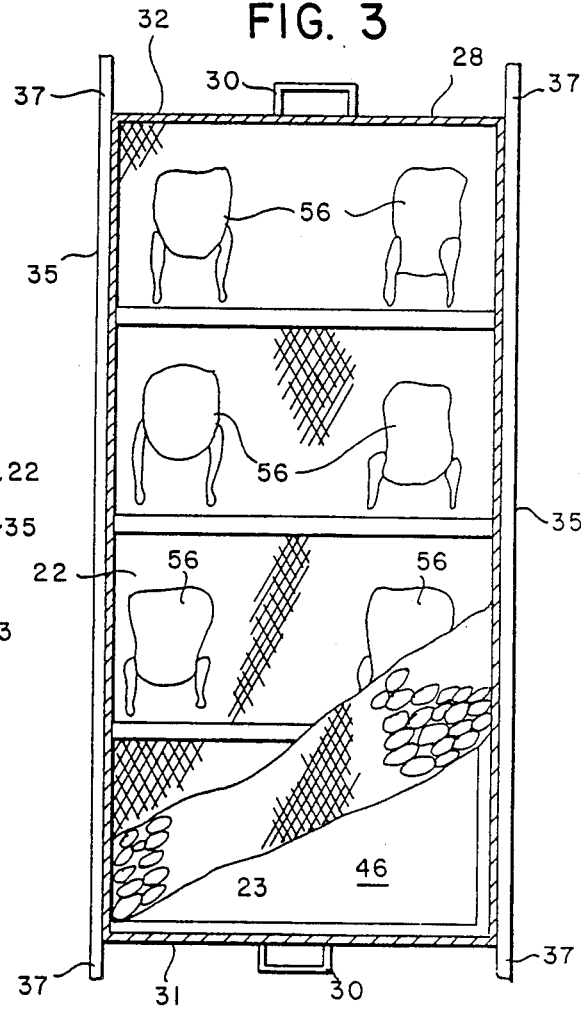
FIG. 3 is a partial top plan view taken on the line 3—3 of FIG. 2.

The food product to be barbecued, in this instance chicken, is uniformly placed on the grill as seen, for instance, in FIG. 3, desirably before the grill 22 is placed over the firebox 25, although they alternatively can be positioned after the grill is in place. The chicken 56 which may be whole chickens or repetitive individual parts such as breasts, is uniformly spaced as seen in FIG. 3 on the grill. The chickens or parts thereof are placed in grid fashion as seen in FIG. 3 over relatively the entire surface of the grill 22. The entire surface of the grill including angled sides 35 and 36 can be in effect packed with food providing the food extends in a single layer.

The enclosure 21 is then placed over firebox 25 and grill 22 and rests thereon on grill 22. The enclosure 21 extends in an outward lip around its bottom perimeter, for instance ¾" along sides 35 and 36. This lip rests on the grill 22. The enclosure 21 extends entirely over the grill 22, and its weight keeps it stable on the grill 22 and firebox 25. The walls of the firebox 25 and enclosure 21 in effect form extensions of one another. The combined vertical walls of the firebox and enclosure are in excess of the width of the firebox with the enclosure itself having a height approximately that of its width.

In one instance, twenty-four whole chickens were barbecued in the structure described. The chickens, which weighed about 3 lbs. apiece, were placed on the grill 22 in six rows of four chickens in a row, as illustrated in FIG. 3. The chickens were seasoned with garlic oil and sweel basil before being placed on the grill.

After the enclosure 21 was placed over the grill, the chickens were cooked for one hour at a temperature of at least 400° F. which was reached within minutes after the enclosure 21 was put in place and this relatively high temperature prevailed within the enclosure during the cooking process. The chickens were barbecued for one hour and the enclosure 21 was removed. The grill 22 with the chickens thereon wa removed in litter fashion from the firebox, and the chickens were sauced with barbecue sauce. The coals were redistributed over the bottom of the firebox where necessary to provide a more even heat. The enclosure 21 was replaced in position over the firebox 25 and the chickens 56 continued to cook for one-half hour, after which they were checked and found to be completely and uniformly cooked to a moist, tasty condition. Some of the chickens were removed and served. The remaining chickens were retained on the grill within the enclosure, which was replaced, for three more hours to serve late-arriving guests.

During the "keeping" stage or warming stage of the chicken, eight of the holes 29 in the top were plugged with aluminum foil, leaving the two open holes in the center of the top. Nine of the twelve bottom holes were plugged. The plugging of the holes cuts substantially the amount of primary and secondary air to burning briquettes in the firebox, thereby in effect banking the fire and reducing the temperature. I should be understood that the amount of holes plugged will vary, in order to keep the warming temperature at around 225° F. A thermometer can be suspended through one of the holes, and then the holes can be suitably plugged until the desired temperature is reached.

Alternately, the temperature within the enclosure can be reduced after the cooking phase, and during the warming phase by removing some of the hot coals, for instance one-half, from the firebox and re-spreading the remaining hot coals to create a less intense heat.

It was found that after keeping the chicken warm under these conditions for another two hours, the chicken continued to have all the desirable qualities, including moistness, set forth above.

It is believed the extremely favorable and uniform cooking results are achieved in large part from the effect the relatively huge enclosure 21 has in keeping a large quantity of hot moist gas enclosed around the meat.

Figure 4:
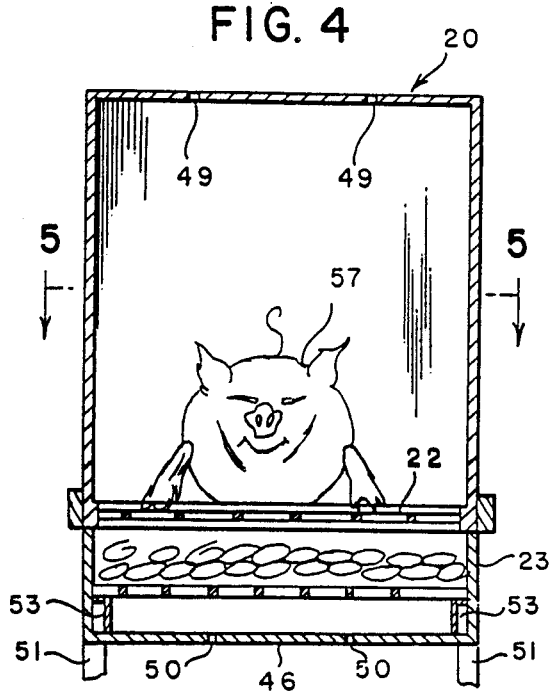
FIG. 4 is a vertical sectional elevational view, similar to FIG. 2, of the assembled device being used to barbecue a relatively large animal such as a pig.

In another instance, the apparatus was used to barbecue a 67 lb. dressed pig 57. As seen in FIG. 4, the pig was placed on the grill 22 and centered thereon.

Figure 5:
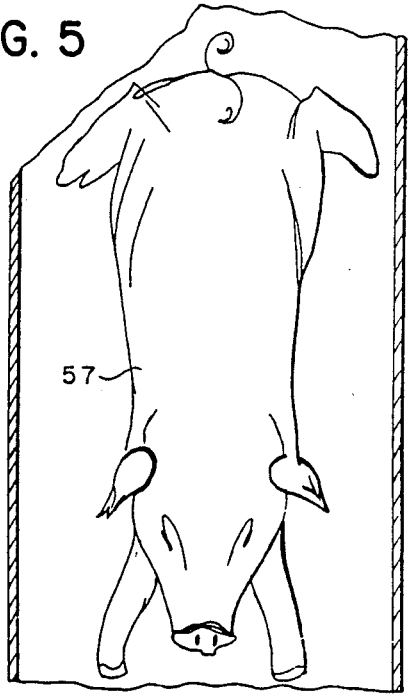
FIG. 5 is a vertical sectional elevational view, similar to FIG. 3, taken on the line 5—5 of FIG. 4.

As seen in FIG. 5, the pig 57 was extended in spread-eagle fashion to occupy the grill area over the coals. About 60 lbs. of charcoal briquettes are desirably somewhat grouped to provide a more intense heat in the heavier areas of the pig, such as the hams and the shoulders. The charcoal was heaped somewhat against the sides of the firebox to provide more heat to these heavier parts of the pig.

After twenty minutes of ignition of the charcoal, the pig was then placed on the grill in spread-eagle fashion, and the apparatus assembled. After five minutes, the temperature rose to at least 450° F. The pig was barbecued for about four hours, after which the enclosure was removed and the pig checked. The hams and ribs were cooked. The charcoal was then rearranged below the pig to provide additional heat for the shoulders, which took another hour to cook. In this arrangement, most of the charcoal was placed in the end of the box near the shoulders with some charcoal placed under the shoulders. The temperature of the meat when similarly checked after the cooking was complete was well in excess of 180° F. The pig was then removed and suitably served.

It is expected that with frequent use, knowledge of where specifically to place the charcoal to get even barbecuing for a large animal, non-uniform in weight distribution, will be obtained.

I claim:

1. An improvement in a field barbecue apparatus for cooking food, large enough to cook at least a 65 lb. dressed pig laying horizontally, having
   (1) a sheet metal firebox with
      (a) a flat bottom,
      (b) vertical walls extending from the bottom, and
      (c) an open top;
   (2) a metallic grid fire bed within the firebox for supporting hot coals;
   (3) a metallic grid grill in the form of a cooking utensil with parallel bars over the firebed; and
   (4) a sheet metal enclosure over the firebox; comprising
      (A) said firebox being rectangular in vertical and horizontal cross sections, and having
         (1) a horizontal ledge around the inside of the vertical walls of the box, and
         (2) ventilating holes in the flat bottom;
      (B) said firebed extending horizontally completely over the interior of the firebox and removably resting on the ledge thereof;
      (C) said grill extending completely over the firebox and resting on the vertical walls thereof, and
      (D) said enclosure, removably resting over the firebox, having
         (1) a flat top,
         (2) vertical side walls extending downwardly from the top, and
         (3) an open bottom rectangular in vertical and horizontal cross sections, the horizontal cross section conforming in size and shape to the horizontal cross section of the firebox so that the firebox walls and the enclosure walls form substantially extensions of one another,
         (4) the height of the enclosure being in excess of the enclosure width; and having
         (5) ventilation holes in the top of the enclosure; wherein
            (1) said enclosure comprises means for containing and positioning a body of substantially still gases primarily above the food to provide a moist heat environment that contributes substantially to cooking and keeping food in a moist state; and
            (2) said ventilating holes in the firebox and the enclosure provide means for controlling the temperature and moisture content of said body of substantially still gases.

2. An apparatus of claim 1 wherein handles extend the ends of the grill in litter fashion.

3. An apparatus of claim 1 having removable secured pipe legs extending downwardly from the firebox.

* * * * *